(12) United States Patent
Laitinen et al.

(10) Patent No.: US 9,319,386 B2
(45) Date of Patent: Apr. 19, 2016

(54) SECURITY FOR MOBILITY BETWEEN MBMS SERVERS

(71) Applicant: Nokia Corporation, Espoo (FI)

(72) Inventors: Pekka J. Laitinen, Helsinki (FI); Silke Holtmanns, Klaukkala (FI); Rune Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 106 days.

(21) Appl. No.: 14/028,654

(22) Filed: Sep. 17, 2013

(65) Prior Publication Data

US 2014/0082360 A1    Mar. 20, 2014

Related U.S. Application Data

(60) Provisional application No. 61/701,936, filed on Sep. 17, 2012.

(51) Int. Cl.
*H04L 9/32* (2006.01)
*H04L 29/06* (2006.01)
*H04W 12/04* (2009.01)

(52) U.S. Cl.
CPC .......... *H04L 63/0428* (2013.01); *H04L 63/061* (2013.01); *H04W 12/04* (2013.01)

(58) Field of Classification Search
CPC ............ H04L 63/0428; H04L 2209/80; H04L 63/062; H04L 63/0853; H04L 9/0819; H04L 63/18; H04L 63/06; H04L 9/0891; H04L 12/04; Y10T 29/49826
USPC ........................................................ 713/168
See application file for complete search history.

(56) References Cited

U.S. PATENT DOCUMENTS

| | | | | |
|---|---|---|---|---|
| 7,903,821 B2* | 3/2011 | Zhu | ....................... | H04L 9/0822 370/328 |
| 8,457,318 B2* | 6/2013 | Gunther | ............... | H04L 63/062 370/331 |
| 2008/0123856 A1* | 5/2008 | Won | ....................... | H04L 9/0833 380/277 |
| 2008/0130547 A1 | 6/2008 | Won et al. | ...................... | 370/312 |
| 2009/0282246 A1 | 11/2009 | Günther | ....................... | 713/168 |
| 2013/0294603 A1* | 11/2013 | Lehtovirta | ............ | H04L 63/064 380/270 |

OTHER PUBLICATIONS

3GPP TS 33.246 V10.0.0 (Feb. 2010); "$3^{rd}$ Generation Partnership Project; Technical Specification Group Services and System Aspects; 3G Security; Security of Multimedia Broadcast/Multicast Service (MBMS) (Release 10)"; Dec. 2010; whole document (68 pages).

* cited by examiner

*Primary Examiner* — Eleni Shiferaw
*Assistant Examiner* — David Massie
(74) *Attorney, Agent, or Firm* — Harrington & Smith

(57) ABSTRACT

In accordance with the exemplary embodiments of the invention there is at least a method and apparatus to perform operations including triggering by user terminal device a new streaming server to generate new user-specific security keys; receiving at the user terminal device from the new streaming server a new security key specific for the new streaming server; generating at the user terminal device for the streaming server user-specific security keys; and using the new user-specific security keys generated at the user terminal device with the new streaming server for a previously established streaming service.

36 Claims, 6 Drawing Sheets

| MBMS | | | | |
|---|---|---|---|---|
| Multimedia Broadcast/Multicast Service (MBMS) is point-to-multipoint service where a service is able to securely transmit data to a given set of users. | | | | |
| Key | Purpose | Type | Usage | Notes |
| MTK | Data protection (MBMS Traffic Key) | Service specific | MTK is used to encrypt MBMS data in BM-SC, and decrypt MBMS data in UE | MTK is always used to decrypt MBMS data in ME. |
| MSK | Data protection (MBMS Service Key) | Service specific | MSK is used to derive service specific MTKs. (MSK is longer lived than MTK) | MSK is generated by BM-SC |
| MUK | Key distribution (MBMS User Key) | User specific | MUK is used to encrypt MSKs in BM-SC before they are sent to UE using MIKEY. UE decrypts MSKs using MUK. | GBA is used to derive MUK. |
| MRK | Authentication (MBMS Request Key) | User specific | Used to authenticate UE's MSK request in BM-SC (using HTTP Digest) | GBA is used to derive MRK. |

Figure 1A

| BCAST | | | | |
|---|---|---|---|---|
| OMA BCAST is point-to-multipoint service where a service is able to securely transmit data to a given set of users, but there is also a pay per view variant. | | | | |
| Key | Purpose | Type | Usage | Notes |
| TEK | Data protection (Traffic Encryption Key / Program Key) Layer 3 | Service specific | Short term key used for data encryption. | If the PEK is contained in the short term key message, then the SEK is used to protect the message, else the PEK is used for pay-per view customers for protection of TEK. If the customer is not a pay-per view customer, then the TEK is protected by the SEK. |
| SEK / PEK | Data protection (Service Encryption Key / Program Encryption Key)) Layer 2 | Service specific | The SEK or PEK protect the short layer 3 keys. (The keys of layer 2 are longer lived then layer 3 keys) | If a customer is a pay-per view, then the PEK is received. |
| SMK / REK | Key distribution (Subscriber Management Key / Rights Encryption Key)) Layer 1 | User specific | The SMK / REK is used to protect messages containing the long term keys (SEK / PEK) | SMK is for the case the SI registration is based on shared secret key and the REK is for the case that a device private key is used. |
| SI-shared / SI-private | Authentication (SI Subscriber Identity) Layer 0 | User specific | Used to authenticate UE's SMK or REK request | The SI registration can be based on shared key or on device private key. The shared key variant is similar to shared key based SI registration. |

Figure 1B

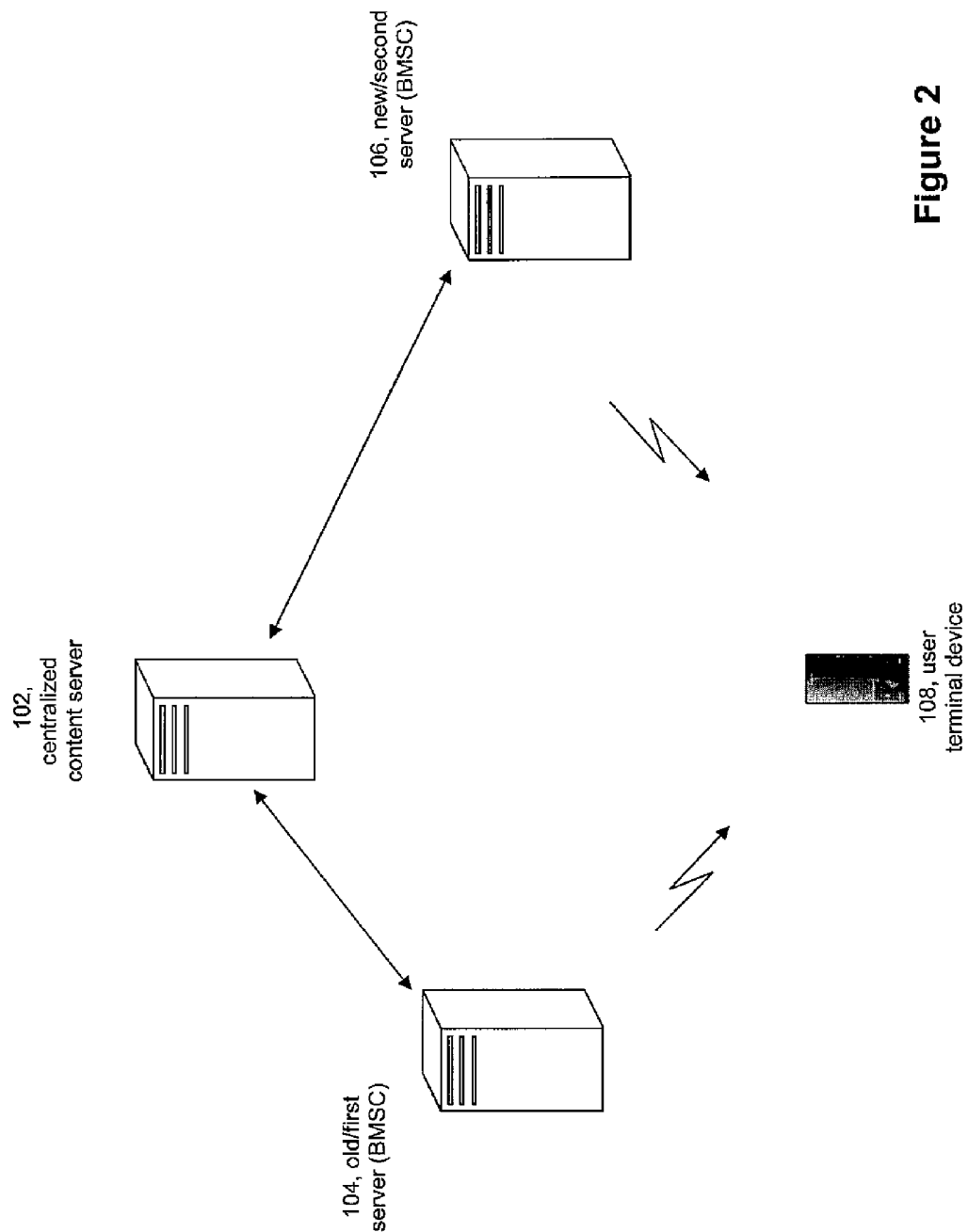

SECURITY FOR MOBILITY BETWEEN MBMS SERVERS

RELATED APPLICATIONS

This patent application claims priority under 35 U.S.C. §119(e) from U.S. Provisional Patent Application No. 61/701,936, filed Sep. 17, 2012 the disclosure of which is incorporated by reference herein in its entirety.

TECHNICAL FIELD

The exemplary and non-limiting embodiments of this invention relate generally to wireless communication systems, methods, devices and computer programs and, more specifically, relate to multicasting or broadcasting service (e.g. multimedia broadcasting/multicasting service MBMS or OMA BCAST) in a wireless network in which the end users are mobile and move among the coverage of different servers which broadcast the streams.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A milestone was recently reached for multimedia broadcast/multicast service (MBMS) in that there has been a large scale commercial deployment of streaming mobile television by a large wireless carrier, specifically using the MediaFLO® model. MBMS in general is a point to multipoint service which is able to securely transmit data, like Mobile TV, to a given set of users that subscribed to the service. The security works as such that there are user specific keys, which like the service keys are handled in a point-to-point manner, while the service content related keys are multicast/broadcast based. Further details as to MBMS security (eMBMS for the evolved UTRAN or LTE systems) may be seen in the technical specification 3GPP TS 33.246 v10.0.0. To cover a wide geographical area carriers typically need to deploy more than one broadcasting server, depending on how many delivery points each server supports. The end user may move between the coverage of those servers from which end users receive the MBMS stream, such as when users travel to and from work.

The security architecture for MBMS is based on a generic bootstrapping architecture (GBA), but GBA was not designed for mobility between MBMS servers (named BM-SCs). Specifically, the key hierarchy in MBMS has two classes of keys as can be seen in the prior art table at FIG. 1: user-specific and service-specific. FIG. 1A illustrates four security keys:

MTK (MBMS traffic key) is used to encrypt MBMS data (e.g. Mobile TV data) in the BMSC or backend server and to decrypt data in the user equipment (UE) also called terminal;

MSK (MBMS service key) is generated by the BMSC and is used to decrypt the service specific MTKs;

MUK (MBMS user key) is used to encrypt the MSKs in the BMSC before they are send to the UEs and used by the terminal to decrypt; and MRK (MBMS request key) is used by the BMSCs to authenticate and authorize a terminal MSK request.

The MUK and the MRK are user specific and server specific (i.e. bound to a specific BMSC based on GBA), while the MSK and MTK are service specific.

As shown at FIG. 1B, the OMA Broadcast BCAST system has the same logical key hierarchy, with TEK as the traffic key, SEK and PEK as the service key, SMK and REK similar to the user key, and SI (shared or private) similar to the user authentication/request key. OMA Broadcast also suffers similar deficiencies with regard to the combination of mobility and security. The teachings below explain some security issues that arise when using GBA for mobile streaming with mobility between servers, and how to address those security issues.

The invention applies to any device or terminal that is able to generate GBA-based cryptographic keys and are able to receive MBMS or BCAST messages, i.e. not necessarily only mobile phones.

SUMMARY

In an exemplary aspect of the invention, there is a method comprising triggering by user terminal device a new streaming server to generate new user-specific security keys; receiving at the user terminal device from the new streaming server a new security key specific for the new streaming server; generating at the user terminal device for the streaming server user-specific security keys; and the user terminal device using the new user-specific security keys generated at the user terminal device with the new streaming server for a previously established streaming service.

In another exemplary aspect of the invention, there is a non-transitory computer readable medium encoded with a computer program executable by a processor to perform actions comprising: triggering with a user terminal device a new streaming server to generate new user-specific security keys; receiving with the user terminal device from the new streaming server a new security key specific for the new streaming server; generating with the user terminal device for the streaming server user-specific security keys; and using the new user-specific security keys generated at the user terminal device with the new streaming server for a previously established streaming service.

In another exemplary aspect of the invention, there is an apparatus comprising at least one processor; and at least one memory including computer program code, where the at least one memory and the computer program code are configured, with the at least one processor, to cause the apparatus to at least: trigger a new streaming server to generate new user-specific security keys; receive from the new streaming server a new security key specific for the new streaming server; generate for the streaming server user-specific security keys; and use the new user-specific security keys generated at the user terminal device with the new streaming server for a previously established streaming service.

In still another exemplary aspect of the invention, there is an apparatus comprising means for triggering by user terminal device a new streaming server to generate new user-specific security keys; means for receiving at the user terminal device from the new streaming server a new security key specific for the new streaming server; means for generating at the user terminal device for the streaming server user-specific security keys; and means for using the new user-specific security keys generated at the user terminal device with the new streaming server for a previously established streaming service.

In accordance with the exemplary embodiments of the invention as described in the paragraph above the means for receiving comprises an interface to a communication network, and the means for triggering, generating, and using comprises a computer-readable medium including computer program code, the computer program code executed by at least one processor.

BRIEF DESCRIPTION OF THE DRAWINGS

FIGS. 1A-B are prior art tables summarizing some of the security keys used for providing MBMS services and OMA Broadcast BCAST services, respectively.

FIG. 2 is a schematic diagram showing an exemplary arrangement of devices for multicasting, in which a user terminal device moves between multiple streaming servers to receive a MBMS or BCAST service.

DETAILED DESCRIPTION

Figure 3:
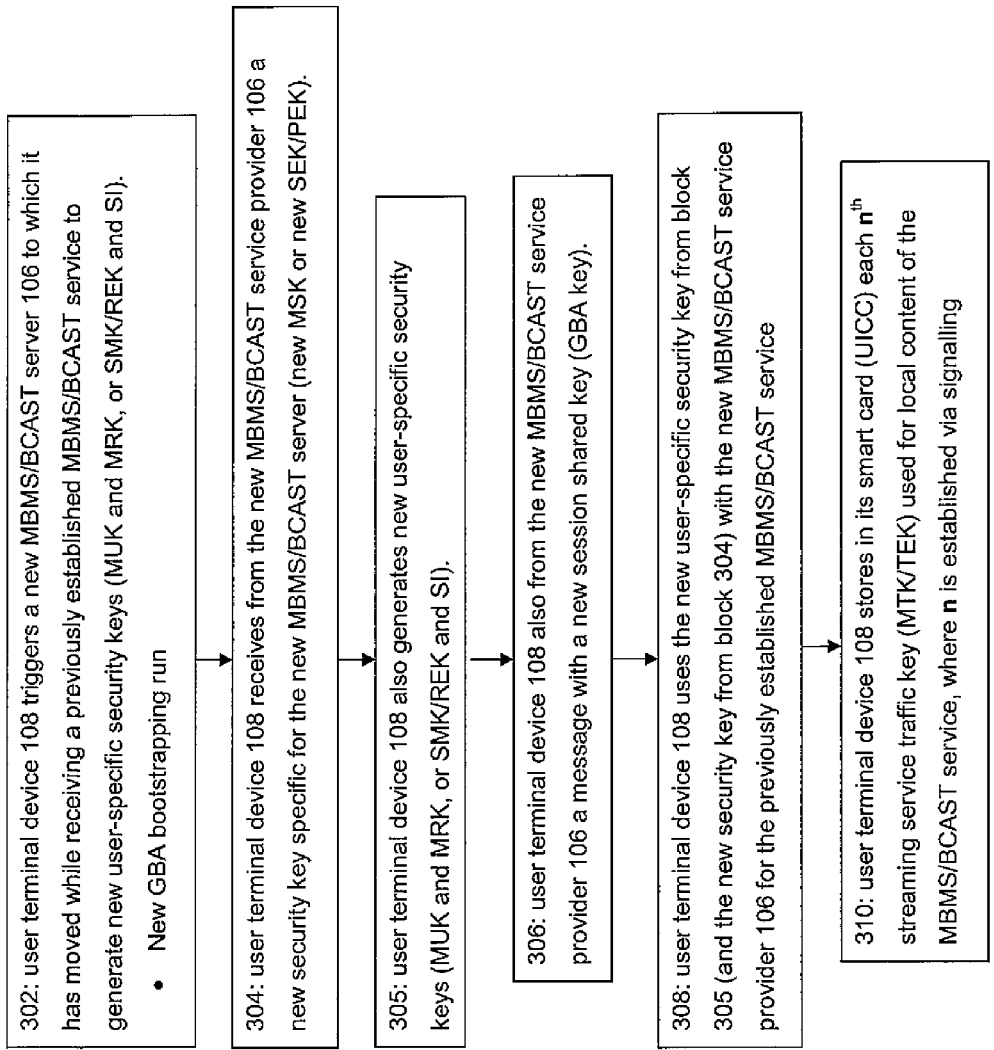
FIG. 3 is a logic flow diagram that illustrates the operation from the perspective of the user terminal device of a method, and a result of execution of computer program instructions embodied on a computer readable memory, in accordance with an exemplary embodiments of this invention.

As an overview of the MBMS or BCAST multicast service where the user is mobile, FIG. 2 illustrates one exemplary but non-limiting example. A user terminal device 108 or some other mobile electronic device receives a multicast stream from a plurality of streaming server devices 104, 106 as the user terminal device moves between them. The content providing server 102 may reside in the cellular network, but may also reside outside. The data itself which is encrypted may originate from a different content provider server, such as for example one operated by a film company. The content can be encrypted with the MTK in the content providing server. But it is also possible that the content is coming directly from the BMSC 104, 106 (local content) and encrypted there (e.g. local weather forecast). FIG. 2 is described further below with reference to MBMS and its security keys, but FIG. 2 also represents the BCAST system with its differently named but functionally similar security keys that are summarized at FIG. 1B.

For convenience server 104 is considered the 'old' or first server from which the user terminal device 108 moved from and server 106 is the 'new' or second server to which the user terminal device 108 moved to. The MBMS content provider or other centralized content server 102 provides the MBMS content to the streaming servers 104, 106. In typically arrangements the centralized content server 102 encrypts the content with the MTK and the individual servers 104, 106 use the MUK to protect the MSK when the MBMS service key is sent over the air to the user terminal device 108. The user terminal device 108 uses its server-specific MUK to decrypt the various MSKs from the various servers 104, 106 providing the service, and then obtains the MTK using the MSK to decrypt the MTK delivered together with the streaming MBMS service. But since the different servers 104, 106 providing the service can have different MSKs the user terminal device 108 will have different MUKs for the different servers 104, 106 providing the MBMS service to it. The cryptographical way the MUK is generated ensures that for each server the resulting MUK is different. There may also be multiple MTKs for a given MBMS service, one for the national content and multiple other MTKs for the local content, and these local content MTKs may differ as between different service providing servers 104, 106.

Mobility between MBMS-Servers when the GBA is the underlying architecture introduces two security problems:

Different MTK_ID consumption on different servers leads to that the servers which are using the same service key MSK becoming out of synchronization. In order to prevent replay of the same message the lower boundary of the service key, MSK, gets the MTK_ID number of the last decrypted MTK. If one server consumes more MTK_IDs than the other one and you move from a higher MTK_ID consuming server to one with less consumption you will start receiving MTK_IDs that you already have received. As you are not allowed to decrypt these messages, due to protecting against replay attacks, the end user can experience an interruption in the service. This situation may easily arise, when there is local content or high mobility.

It is assumed that the MSKs are server specific; hence the MTKs for traffic would not be accessible if the server has been changed. If the user has both MSKs then it should work regardless of which BMSC the user is attached and the user terminal (UE) could decrypt whatever MBMS data it receives. But a problem does arise if one stream fades and for the new server the MSK is not there or the MSK has expired.

If we assume that the MSK are NOT server specific, then a security problem arises when the MSK expires and cannot be refreshed, since the MUK-based authorization would fail (see next bullet).

Assuming the different servers are using the same MSK, a security problem arises also where the user is not able to refresh the MSK, since the authorization is from the old BMSC server and not the new one that the user is currently listening to. This would normally require generating a new MUK for the MSK delivery from this new server.

If the MTK_ID consumption is too high, one result will be an exhausted smart card (memory wear-out). Estimates show for an assumed key refresh of 5 s (as considered for practical deployments) there will be only about a 3-4 month lifetime before the card is exhausted and no longer usable (at least not for MBMS). This implies that the cellular operator would need to send a new smart card (UICC) to the user about every 3 months.

The problem of a difference in MTK_ID consumption rates becomes even more imminent when the streaming servers also provide local content, for example when the MBMS streams provide a common news feed with certain "slots" for local advertisements which may differ (e.g., an advertisement for streaming in California may be different from an advertisement in Florida for the same timeslot of a common news stream). This leads to a situation where the gap between the current MTK_ID on one server as compared to another server will increase over time, and it will reset only at the next MSK update.

Exemplary embodiments of these teachings provide a protocol which avoids an excessive MTK_ID consumption, and which enables MSK updates. The examples below are also backward compatible with pre-existing MEMS deployments so can be adopted in the current MBMS infrastructure. Similarly for the BCAST system, these teachings avoid excessive TEK consumption and enable SEK/PEK updates, and are backward compatible with pre-existing BCAST deployments.

First consider FIG. 2 which is a schematic overview of two servers 104, 106 providing a MBMS service to a user terminal device 108, and a centralized content server 102 which is in the position of the content provider. The centralized content server 102 encrypts the content it provides with the MTK. Each of the first 104 and second 106 servers are BMSCs and each has their own MSK which can be used to decrypt the MTK. The user terminal device 108 has a MUK and different MUKs may be valid for the different BMSCs 104, 106. The user terminal device 108 is successfully receiving the MBMS service from the old first server 104 using its MUK valid for that server 104 to decrypt the MSK it gets from that server and decrypt the MTK. As the user terminal device 108 moves from that old first server 104 to the new second server 106, there is a new MSK for that second server 106 and also the MTK is either expiring or about to expire (since the MTK has a very brief lifetime this will happen soon, or the MTK for the different servers may be different when the user terminal changes servers during transmission of local content). Under conventional MBMS the user terminal device 108 is no longer able to decrypt the MBMS service from the new second server 106 because the MTK has expired and the user terminal device 108 does not know the MSK for that second server 106.

In current deployments of MBMS the majority of the content is encrypted by the content provider server 102 with the MTK; so for example in the deployment mentioned in the background section may have a pipe to CNN® and it is CNN® that encrypts the content they provide. The content provider then provides the content data and the MTK to the MBMS server (BMSC). The server may stream data from different content providers using the same MSK, and as noted above with local advertising slots within the same service the stream can have either "national" or "local" content, or both.

The BMSC then assemblies the data, encrypts the MTK with the MSK and assigns the message an MTK_ID. The BMSC is therefore the entity that keeps the MTK_IDs in ascending order. If the MSK is server specific then there would not be this "step back" in MTK_IDs. Instead what would be needed is a new MSK when moving to this server, using the normal process for retrieving the MSK. If the MSK is not server specific then there would be this "step back" in MSK IDs, and in addition there would be a problem when retrieving the MSK since the MUK is server specific anyway.

Now consider the MBMS process from the perspective of a user moving between streaming servers (BMSCs) to continuously receive the same MBMS service (which as noted above for advertising slots may have different local content). The user has a server specific MSK, but recall from above and FIG. 1 that the MBMS Service Key/MSK is server specific, NOT user specific. It is specific to a particular MBMS server, but this user is receiving the same MBMS service from multiple different servers that are running that same service (same national content). The MSK is different on the different BMSCs and so the user is getting the same MBMS service from multiple servers each using a different MSK. The MSK is used to protect the sending of the MTK (MBMS Traffic key) to the mobile user device. It is the MTK that is used to actually encrypt the content which is streamed from the different BMSCs, and in the above example using CNN® as content provider it is CNN® that uses the MTK for content encryption.

To review, the MTKs are content specific and for a given MBMS service can be the same for all servers, but the MSK needs to be server specific. Different servers streaming the same MBMS service can in the case of local content use different MTKs, and the MSK that protects the sending of the respective MTK will be different on the different BMSCs. For BCAST the similar is true, where the TEK of BCAST is analogous to the MTK of MBMS, and the SEK/PEK of BCAST is analogous to the MSK of MBMS.

Again from the user perspective, the user device receives the encrypted content and checks which BMSC server this stream was coming from, then chooses the correct MSK to decrypt the MTK and decrypts the content. Under the above scenario where the content provider encrypts the content with the MTK, it follows that there are several "records" (groups of data on the UICC or terminal) which are server specific. For example, on the UICC (, commonly referred to as a smart card; it is a new generation subscriber identity module SIM in the user device/smartphone) one record would have one set of data (the MSK_ID, MTK_ID, Keys, and key related data) for MBMS server. MBMS can be implemented on the user device side by only the user terminal device or also using the user terminal device in conjunction with the UICC/smart card.

From the perspective of the user device, there are two possibilities for when the MTK key expires. If the user already has the MSK from its current MBMS server, then the user device can simply decrypt the new incoming MTK using the known MSK for this server.

But if the user device is moving between servers and the MTK expires, the user will not have the MSK for the new server it is moving to. In this case the user will request an MSK update. Current specification for this event provide that the user has to contact the BMSC, but the problem is that the user specific key that is used for authorization (the MUK, MBMS User Key) is server specific and contains the name of the server as a key derivation parameter. So in this case the user device's mobility will result in the authorization failing. In exemplary embodiments of these teachings the user terminal device notices in advance from the MTK_ID that the BMSC will be changing (the user terminal device can see from the MTK_ID that it comes from a different server), and proactively take the steps detailed below to refresh the keys and derive a new MSK to avoid MBMS service interruption. Or if the MSK expires the user terminal device can take these same steps also.

According to exemplary embodiments of these teachings, when the user device moves from an old first server/BMSC to a new second server/BMSC for an ongoing MBMS service, and the MSK is either expired or about to expire, the user device automatically makes a new bootstrapping run for the new server to obtain a new MUK. From the server side the new server/BMSC contacts the GBA bootstrapping server function (BSF) for new keys for this user. Alternatively the new server/BMSC derives from the GBA session shared key (Ks) a new server specific MUK, but this alternative assumes the Ks key is still valid sufficiently long. In either case, when the MRK and MUK keys are then generated in the user terminal device, the user terminal device makes a new MSK update request as is currently specified for MBMS. In the BCAST service the new bootstrapping run will generate a new SEK and PEK similar to the new MSK in MBMS, and also a new SMK and REK similar to the new MUK in MBMS.

If the MSK expires or is expired and the user wants then to use the service (for example, the service has not been used during the mobility event, or the mobility event and the expiry of the MTK occur at about the same time), the MBMS network does not know under which BMSC the user terminal device is under. So the user terminal device will then start a refresh. There are two ways for the user terminal device to do this.

If there is no mobility then the user terminal device is under the same server then the expiring or expired MSK is under the same server. This case can be handled by conventional MBMS refresh procedures.

In the mobility scenario where the user terminal device is moving from an old first server to a new second server and the MSK for the MBMS service is expired or about to expire, then the new MSK for the same MBMS service will be from the new second server. If the terminal already has the MUK for use with this new second server then the user terminal device can initiate a MSK refresh as is conventional in 3GPP specification TS33.246, but with the new second server. Note that the user terminal device may have several MUKs at any given time, which would be stored in those records mentioned above. The MSK updates are point-to-point messages which means the user terminal device will get from this MSK refresh procedure a new MSK for each MUK that it has.

But for the case that the user terminal device does not have the MUK for this new second server and the MSK is expiring or expired, then the user terminal device needs to make a bootstrapping run.

In one exemplary embodiment the new second server can deliver to the user terminal device the new MSK with the message for the generation of the GBA key in one point to point message in order to save a bit on signaling overhead. But in other embodiments these may be provided to the user terminal device in separate point to point messages.

Unlike current implementations where the smart card has only one data set for only one MBMS server, in these teachings then the user terminal device would then have two or more MSKs which belong to the same MBMS service. The user device may store these bundled in a group so that the terminal knows that those have to be kept updated. Or in another embodiment the user terminal device can just store the expiry time and then pro-actively update the different MSKs for a given MBMS service.

In the above it is advantageous that the user terminal device can also request an MSK from another server which the device is currently not using, in order to avoid any service interruptions when the user is moving back into that other server's coverage area.

Some of the above embodiments of these teachings from the perspective of the user terminal device 108 are summarized at FIG. 3. FIG. 3 can represent method steps according to an exemplary embodiment of the invention, actions which result from execution by a processor of program instructions that are stored on a memory, or functional steps taken by an apparatus such as a user terminal device 108 shown at FIGS. 2 and 4. So for example if there is an apparatus comprising at least one processor and at least one memory storing a program of computer readable instructions such as that shown at FIG. 4, the at least one memory and the computer readable instructions may be configured with the at least one processor to cause the apparatus at least to perform the steps set forth at FIG. 3.

More specifically, at FIG. 3 the user terminal device at block 302 triggers a new MBMS/BCAST service provider to which it has moved while receiving a MBMS/BCAST service (the second server/BMSC 106 at FIG. 2) to generate new user-specific security keys (the MUK and MRK for MBMS, or the SMK/REK and Sis for BCAST). In the above example the user terminal device does this by starting a GBA bootstrapping run. Then at block 304 the terminal device receives from the new MBMS/B CAST service provider a new security key specific for the new service provider (the new MSK for MBMS, or the new SEK/PEK for BCAST). The user terminal device also generates the new user-specific security keys for the streaming server at block 305, either before or after it receives the server-specific security key at block 304. At optional block 306 the user terminal device also from the new MBMS/BCAST service provider a message with a new session shared key (the GBA Ks key). Then finally at block 308 the user terminal device uses the new user-specific security key it generated (the new MSK or SEKTEK that the user terminal device generated at block 305, and also the new security key from block 304 that the terminal device received) with the new MBMS/BCAST service provider for the previously established MBMS/BCAST service. More generally the MBMS/BCAST server and MBMS/BCAST service may be referred to as a streaming server and a streaming service. The steps of FIG. 3 may be performed by the user terminal device automatically in response to expiration or near expiration of an old security key specific for an old streaming service provider (the MSK/SEK/PEK of the old/first MBMS/BCAST server 104) which was formerly providing the streaming service to the user terminal device 108.

Above it was discussed that there may be local content added to the 'national' or common content for the MBMS/BCAST service, and this could lead to variances in how the MTKs/TEKs are consumed by the different BMSCs. Referring to FIG. 2, according to embodiments of these teachings the MTK/TEK consumption can be centralized at the centralized content server 102 that provides the content. This is the server 102 that encrypts the MBMS/BCAST content with the valid MTK and forwards it to the streaming servers 104, 106. In these embodiments the centralized content server 102 keeps the master record for the MTK/TEK consumption from all the attached BMSCs 104, 106. For convenience the available MTKs/TEKs and their corresponding identifiers (MTK_IDs or TEK_IDs) may be divided into two domains or pools for this purpose, one domain or pool reserved for global/national content and the other domain or pool reserved for local content. One MBMS service can handle multiple MTKs at the same time so it is not an obstacle for a given MBMS service to have one MTK for the national/common content and other MTKs for the local content. The similar can be done in BCAST with multiple TEKs. In this manner there can be reserved ranges of MTK_IDs/TEK_IDs for national and local content.

Now if some streaming servers have local content, then they consume for the local content more MTKs and also MTK_IDs, and the same for the TEKs in BCAST. So for example one streaming server with California local content might consume 35 MTKs and MTK_IDs for the local content it adds to a given MBMS service while another streaming server in Florida might consume 50 MTKs and MTK_IDs for the local content it adds to that same MBMS service.

In one embodiment the BMSCs report back to the centralized content server 102 the number of MTK_IDs they used for local content for a given MBMS streaming service (or report the number of TEK_IDs for a given BCAST streaming service); for example BMSC #1 used xy MTK_IDs. From these feedback reports the centralized content server 102 is able to keep track of the MTK_IDs that were used, and then the centralized content server 102 could set the next to be used MTK_ID accordingly high. It should be noted, that even if the MTK is used by the centralized content server, the MTK_ID may still be assigned at the BMSC's.

In one embodiment the BMSCs uses a centralized server to provide a time stamp that is used as MTK_ID. If this centralized server is a NTP-UTC server (Network Time Protocol- Universal Time Coordinated) the MTK_IDs between the different BMSCs will remain synchronized and from an MTK_ID point of view there will be no mismatch when switching between different BMSCs. As all BMSCs use the same MSK, the device 108 is able to decrypt the stream coming from the new BMSC. As described the MUK used to decrypt the MSK is server specific so in case of a MSK refresh a new MUK must be generated. This is less of a convenience as the MSK validity period may be in the range of days to months.

In another embodiment the BMSCs request blocks of MTKs for their local usage. The centralized content server 102 then chooses a block of MTKs for a given MBMS service and informs the individual requesting BMSCs which MTK_IDs are available for encrypting local content.

And in a still further embodiment the centralized content server 102 only provides a message to the individual BMSCs 104, 106 with the MTK that can be used by that BMSC for local content. This MTK is encrypted with the MSK from that BMSC in this message from the centralized content server 102. If the BMSC 104, 106 then adds the MTK_ID, which tells the terminal which MSK to be used then there would not be any need for the centralized content server 102 to provide a block of reserved MTK_IDs as above. Any of the above techniques for managing MTKs for national and local content can be similarly applied in the BCAST system for the TEKs and the TEK_IDs.

An alternative proposal to use a sliding window of a fixed amount of MTK_IDs (can also write traffic encryption keys) is insufficient for local content purposes since this is not a large enough number for local content from all the potential different local advertising markets. Also, the possibility of local content will increase the "gap" over time substantially and the fixed window size will not fit. Simply increasing the size of this sliding window also does not seem to be a complete solution since the size of the gap between a least number of MTK_IDs and a most number of MTK_IDs used for local content among all the various servers offering a MBMS service may not be known in advance, and the size of that gap will typically increase over the MSK validity period since local content may be added at early and at late stages of the whole MBMS service.

Server specific MSKs is the solution these teachings propose to enable local advertisements or other local content to be added to the national content in a MBMS service as is detailed below. These same examples also illustrate server specific SEKs/PEKs as a similar solution for the BCAST system.

When a user terminal receiving a MBMS service is mobile and goes to a new server for the first time, there may be a short break in the MBMS service while the user terminal device obtains the new MSK. The user terminal device may also attach to a new BMSC and immediately start generating a new MUK and get a new MSK as detailed above and with respect to FIG. 3 so as to minimize that break in the MBMS service. The user terminal device can then keep the two or more MSKs updated (the new MSK as well as the MSKs for the servers through which it has previously received portions of this same MBMS service). The MSK updates are via point to point messages whereas the MBMS service itself, both national and local content, is point to multipoint.

Above was noted a concern for wearing out the UICC memory; each memory space is viable for only a specific number of reads and writes and wear levelling algorithms take this into account to extend the memory life overall, but still there is a finite number of read/writes over which a memory space will be reliable. To address this issue, according to exemplary embodiments of these teachings the memory in the user terminal device (specifically, the UICC or smart card within that device) should be adapted to store every $n^{th}$ value (where n is an integer greater than 5 or so), rather than storing every MTK_ID. The inventors consider n=10 as a reasonable value for certain practical deployments.

What one wants to achieve is that the card delivers the service rather over a determined time period instead of over a determined period of MTK_ID updates. If the MTK validity period is as an example 5 s then storing every $10^{th}$ means an update rate of every 50 s. If the MTK validity period would be 10 s then one could allow for every $5^{th}$ MTK_ID to be stored without affecting the life time of the smart card. For those reasons, it might be sensible also to enable management of the MTK_ID storage rate remotely by over the air mechanisms to allow the memory wear out to be a function of time instead of a function of updates. The network can impose this by semi-statically signalling the various user terminal devices the value of n to use. There may be reasons why there is a need to change the MTK_ID update rate for a specific service, e.g. the MTK validity period is changed and correspondingly there would be a need to modify the MTK ID storage rate in order to keep the "life time" of the smart card more or less constant. The frequency for how often a specific MTK_ID is to be stored is in an embodiment configurable on the UICC using for example an over the air (signaling) mechanism such as the n value above so that the operator can change the interval if required. If the MTK life time is long then one could store it more often to reach the same life time as with a MTK with a short life time that would be stored less frequently.

This can be done in such a way that when starting the consumption the first MTK_ID value should be stored followed by every $10^{th}$ MTK_ID, or more generally every $n^{th}$ MTK_ID. This is shown at block 310 of FIG. 3 in which the user terminal device 108 stores in its smart card (UICC) only each $n^{th}$ streaming service traffic key (MTK) used for local content of the MBMS service, where n is established via signalling and is an integer greater than one.

Figure 4:
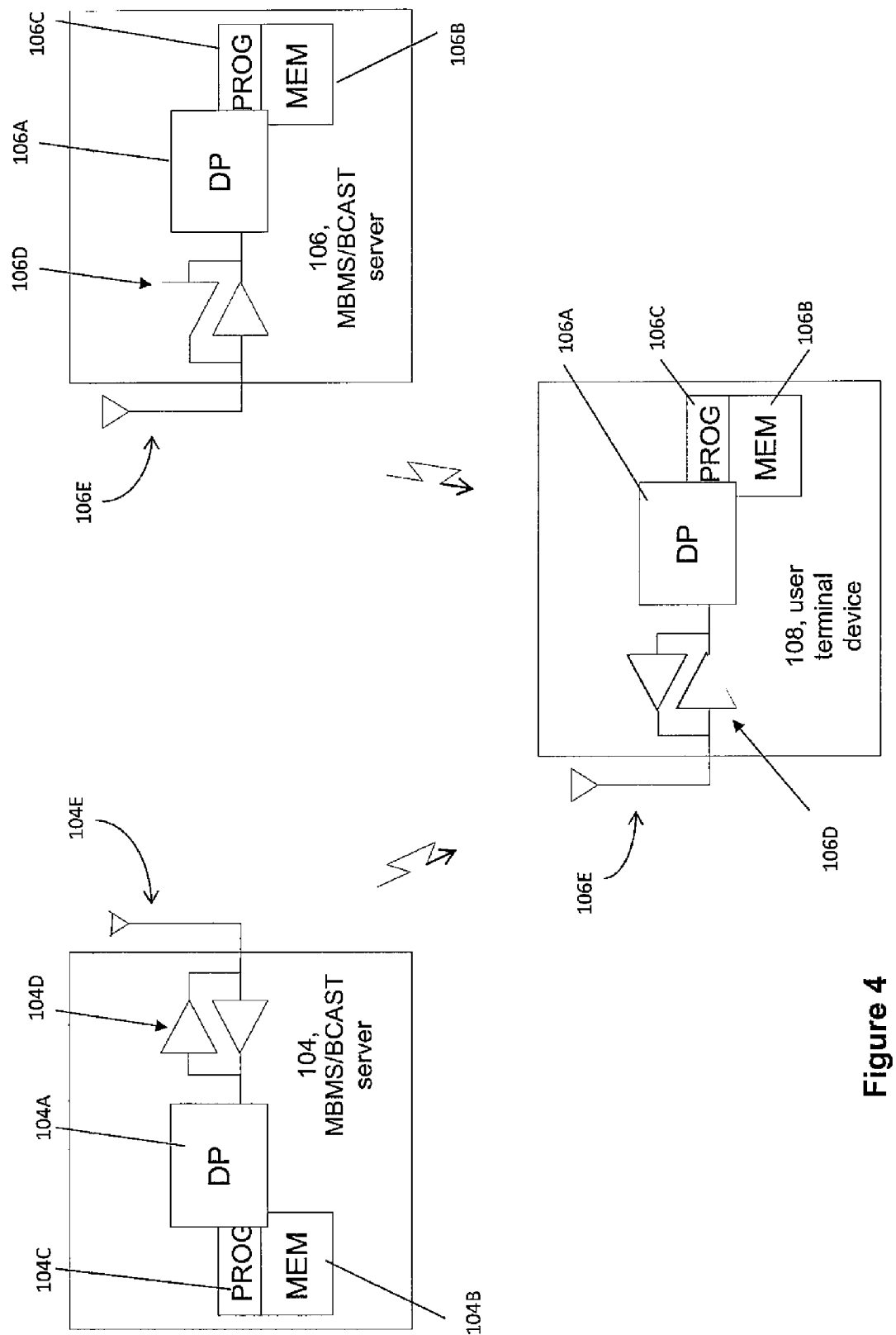
FIG. 4 shows a simplified block diagram of various electronic devices, such as the streaming service providers and user terminal device shown at FIG. 2, that are suitable for use in practicing the exemplary embodiments of this invention.

Reference is now made to FIG. 4 for illustrating a simplified block diagram of various electronic devices and apparatus that are suitable for use in practicing the exemplary embodiments of this invention. In FIG. 4 there is shown a two streaming servers (MBMS/BCAST servers) 104, 106, and one user terminal device 108. The servers 104, 106 are adapted for communication over respective wireless links with the user terminal device 108 as it moves between them.

The first MBMS/OMA BCAST service provider 104 comprises a controller, such as a computer or a data processor (DP) 104A, a computer-readable memory medium embodied as a memory (MEM) 104B that stores a program of computer instructions (PROG) 104C, and a suitable radio frequency (RF) transceiver 104D (shown as separate transmitter and receiver) for bidirectional wireless communications with the user terminal device 108 via one or more antennas 104E. The second MBMS/OMA BCAST service provider 106 may also comprise a controller, such as a computer or a data processor (DP) 106A, a computer-readable memory medium embodied as a memory (MEM) 106B that stores a program of computer instructions (PROG) 106C, and a RF transceiver 106D (also shown as separate transmitter and receiver) for communication with the user terminal device 108 via one or more antennas 106E.

In relevant part the user terminal device 108 is not dissimilar, having one or more controllers such as a computer or a data processor (DP) 108A, one or more computer-readable memories (MEM) 108B that stores a program of computer instructions (PROG) 108C, and one or more RF transceivers 108D (also shown as separate transmitter and receiver) for communication with the servers 104, 106 via one or more antennas 108E.

At least one of the PROGs 104C, 106C and 108C is assumed to include program instructions that, when executed by the associated DP, enable the device to operate in accordance with the exemplary embodiments of this invention such as those detailed above. That is, the exemplary embodiments of this invention may be implemented at least in part by computer software executable by the DP 104A/106A of the servers/service providing devices, and/or by the DP 108A of the user terminal device 108, or by hardware, or by a combination of software and hardware (and firmware).

In general, the various embodiments of the user terminal device 108 can include, but is not limited to, smart phones, UICC cards or other smart cards, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 104B, 106B and 108B may be of any type suitable to the local technical environment and may be implemented using any suitable data storage technology, such as semiconductor based memory devices, flash memory, magnetic memory devices and systems, optical memory devices and systems, fixed memory and removable memory. The DPs 104A, 106A and 108A may be of any type suitable to the local technical environment, and may include one or more of general purpose computers, special purpose computers, microprocessors, digital signal processors (DSPs) and processors based on multicore processor architecture, as non-limiting examples.

Figure 5:
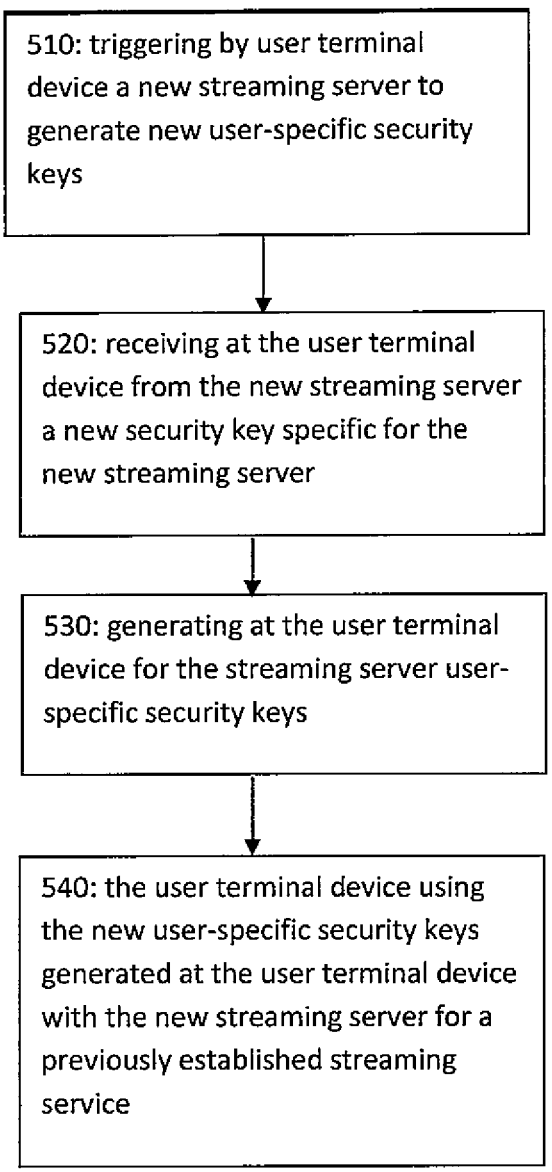
FIG. 5 shows a simplified block diagram to illustrate a method in accordance with the exemplary embodiments of the invention.

FIG. 5 is a block diagram illustrating a method in accordance with the exemplary embodiments of the invention. In block 510 there is triggering by user terminal device a new streaming server to generate new user-specific security keys. In block 520 there is receiving at the user terminal device from the new streaming server a new security key specific for the new streaming server. In block 530 there is generating at the user terminal device for the streaming server user-specific security keys. Then in block 540 there is the user terminal device using the new user-specific security keys generated at the user terminal device with the new streaming server for a previously established streaming service.

The exemplary embodiments of the invention as described in the paragraph above, wherein the streaming service is a multimedia broadcast/multicast service and the previously established streaming service is provided by the new streaming server to which the user terminal device has moved while receiving the multimedia broadcast/multicast service.

The exemplary embodiments of the invention as described in the paragraphs above, wherein the multimedia broadcast/multicast service uses a multimedia broadcast/multicast service traffic key identity from a network time protocol-universal time coordinated server, and wherein the multimedia broadcast/multicast service traffic key identity is synchronized with the new streaming server.

The exemplary embodiments of the invention as described in the paragraphs above, wherein the generated new user-specific security keys comprise a multimedia broadcast/multicast service user key and a multimedia broadcast/multicast service request key.

The exemplary embodiments of the invention as described in the paragraphs above, wherein the streaming service is a broadcast service and the new streaming service provider is a new server to which the user terminal device has moved while receiving the broadcast service.

The exemplary embodiments of the invention as described in the paragraphs above, wherein the generated new user-specific security keys comprise a subscriber management key or rights encryption key and a subscriber identity.

The exemplary embodiments of the invention as described in the paragraphs above, wherein triggering the new streaming server to generate the new user-specific security keys comprises starting a generic bootstrapping architecture bootstrapping run.

The exemplary embodiments of the invention as described in the paragraphs above, wherein the new security key specific for the new streaming server comprises a new multimedia broadcast/multicast service key or a new service encryption key or program encryption key.

The exemplary embodiments of the invention as described in the paragraphs above, the method further comprising the user terminal device further generating for usage with the new streaming server a new shared key generic bootstrapping architecture based on the generic bootstrapping architecture master key Ks.

The exemplary embodiments of the invention as described in the paragraphs above, wherein the user terminal device performs the method automatically in response to expiration or near expiration of an old security key specific for an old streaming server which was formerly providing the streaming service to the user terminal device.

The exemplary embodiments of the invention as described in the paragraphs above, further comprising storing in a smart card only each $n^{th}$ streaming service traffic key ID of an multimedia broadcast/multicast service or broadcast service, where n is established via signalling and is an integer greater than one.

The exemplary embodiments of the invention as described in the paragraphs above, further comprising utilizing over the air signalling to synchronize traffic key identities used by the user terminal device with those used by the new streaming server.

In accordance with the exemplary embodiments of the invention there is an apparatus comprising means for triggering by user terminal device a new streaming server to generate new user-specific security keys; means for receiving at the user terminal device from the new streaming server a new security key specific for the new streaming server; means for generating at the user terminal device for the streaming server user-specific security keys; and means for using the new user-specific security keys generated at the user terminal device with the new streaming server for a previously established streaming service In accordance with the exemplary embodiments of the invention as described in the paragraph above the means for receiving comprises an interface to a communication network, and the means for triggering, generating, and using comprises a computer-readable medium including computer program code, the computer program code executed by at least one processor.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WGA system, it should be appreciated that the exemplary embodiments of this invention are not limited for use with only this one particular type of wireless communication system, and that they may be used to advantage in other wireless communication systems. In addition, the exemplary embodiments of this invention are not limited to multicasting audio-visual streams, and the embodiments may be applied for other type of data as well.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
triggering by user terminal device of a communication network a new streaming server to generate new user-specific security keys for a previously established streaming service in the communication network, wherein triggering the new streaming server to generate the new user-specific security keys comprises starting a generic bootstrapping architecture bootstrapping run;
receiving, by the user terminal device, from the new streaming server a new security key specific for the new streaming server;
generating, by the user terminal device, for the new streaming server the new user-specific security keys, wherein the new user-specific security keys for the new streaming server are generated before receiving the new security key specific for the new streaming server, and wherein the generated new user-specific security keys comprise a multimedia broadcast/multicast service user key and a multimedia broadcast/multicast service request key; and
using, by the user terminal device, the new user-specific security keys generated at the user terminal device with the new streaming server for the previously established streaming service.

2. The method according to claim 1, wherein the streaming service is a multimedia broadcast/multicast service and the previously established streaming service is provided by the new streaming server in a coverage area of the communication network to which the user terminal device has moved while receiving the multimedia broadcast/multicast service.

3. The method according to claim 2, wherein the multimedia broadcast/multicast service uses a multimedia broadcast/multicast service traffic key identity from a network time protocol-universal time coordinated server, and wherein the multimedia broadcast/multicast service traffic key identity is synchronized with the new streaming server.

4. The method according to claim 1, wherein the generating is using a streaming service traffic key identification specific for the new streaming server that is selected from more than one streaming service traffic key identification stored on the user terminal device, and wherein a frequency that the user terminal device stores streaming service traffic key identifications is configured by the user terminal device for each streaming service traffic key identification based on an expected lifetime length of an associated streaming service traffic key.

5. The method according to claim 1, wherein the streaming service is a broadcast service and the new streaming service provider is a new server of a coverage area of the communication network to which the user terminal device has moved while receiving the broadcast service.

6. The method according to claim 5, wherein the generated new user-specific security keys comprise a subscriber management key or rights encryption key and a subscriber identity.

7. The method according to claim 4, wherein the more than one streaming service traffic key identification stored on the user terminal device comprises an $n^{th}$ number of streaming service traffic key identifications, wherein each of the $n^{th}$ number of streaming service traffic key identifications is specific to a different streaming server of the communication network where n number of streaming service traffic key identifications is established via signalling with the user terminal device and n is an integer greater than one.

8. The method according to claim 1, wherein the new security key specific for the new streaming server comprises a new multimedia broadcast/multicast service key or a new service encryption key or program encryption key.

9. The method according to claim 8, the method further comprising the user terminal device further generating for usage with the new streaming server a new shared key generic bootstrapping architecture based on the generic bootstrapping architecture master key Ks.

10. The method according to claim 1, wherein the user terminal device performs the method automatically in response to expiration or near expiration of an old security key specific for an old streaming server which was formerly providing the streaming service to the user terminal device.

11. The method according to claim 1, further comprising storing in a smart card of the user terminal device only each $n^{th}$ streaming service traffic key identification specific to a multimedia broadcast/multicast service or broadcast service, where n is established via signalling and is an integer greater than one.

12. The method according to claim 1, further comprising utilizing over the air signalling to synchronize traffic key identities used by the user terminal device with those used by the new streaming server.

13. A non-transitory computer readable medium encoded with a computer program executable by a processor to perform actions comprising:
  triggering, by a user terminal device of a communication network a new streaming server to generate new user-specific security keys for a previously established streaming service in the communication network, wherein triggering the new streaming server to generate the new user-specific security keys comprises starting a generic bootstrapping architecture bootstrapping run;
  receiving, by the user terminal device, from the new streaming server a new security key specific for the new streaming server;
  generating, by the user terminal device, for the new streaming server the new user-specific security keys, wherein the new user-specific security keys for the new streaming server are generated before receiving the new security key specific for the new streaming server, and wherein the generated new user-specific security keys comprise a multimedia broadcast/multicast service user key and a multimedia broadcast/multicast service request key; and
  using, by the user terminal device, the new user-specific security keys generated at the user terminal device with the new streaming server for the previously established streaming service.

14. The non-transitory computer readable medium according to claim 13, wherein the streaming service is a multimedia broadcast/multicast service and the previously established streaming service is provided by the new streaming server in a coverage area of the communication network to which the user terminal device has moved while receiving the multimedia broadcast/multicast service.

15. The non-transitory computer readable medium according to claim 14, wherein the multimedia broadcast/multicast service uses a multimedia broadcast/multicast service traffic key identity from a network time protocol-universal time coordinated server, and wherein the multimedia broadcast/multicast service traffic key identity is synchronized with the new streaming server.

16. The non-transitory computer readable medium according to claim 13, wherein the generating is using a streaming service traffic key identification specific for the new streaming server that is selected from more than one streaming service traffic key identification stored on the user terminal device, and wherein a frequency that the user terminal device stores streaming service traffic key identifications is configured by the user terminal device for each streaming service traffic key identification based on an expected lifetime length of an associated streaming service traffic key.

17. The non-transitory computer readable medium according to claim 13, wherein the streaming service is a broadcast service and the new streaming service provider is a new server of a coverage area of the communication network to which the user terminal device has moved while receiving the broadcast service.

18. The non-transitory computer readable medium according to claim 17, wherein the generated new user-specific security keys comprise a subscriber management key or rights encryption key and a subscriber identity.

19. The non-transitory computer readable medium according to claim 16, wherein the more than one streaming service traffic key identification stored on the user terminal device comprises an $n^{th}$ number of streaming service traffic key identifications, wherein each of the $n^{th}$ number of streaming service traffic key identifications is specific to a different streaming server of the communication network, where n number of streaming service traffic key identifications is established via signalling with the user terminal device and n is an integer greater than one.

20. The non-transitory computer readable medium according to claim 13, wherein the new security key specific for the new streaming server comprises a new multimedia broadcast/multicast service key or a new service encryption key or program encryption key.

21. The non-transitory computer readable medium according to claim 20, wherein the generating comprises generating, with the user terminal, a new shared key generic bootstrapping architecture based on the generic bootstrapping architecture master key Ks for usage with the new streaming server.

22. The non-transitory computer readable medium according to claim 13, wherein the triggering with the user terminal device is performed automatically in response to expiration or near expiration of an old security key specific for an old streaming server which was formerly providing the streaming to the user terminal device.

23. The non-transitory computer readable medium according to claim 15, further comprising storing in a smart card of the user terminal device only each $n^{th}$ streaming service traffic key identification specific to the multimedia broadcast/multicast service or broadcast service, where n is established via signalling and is an integer greater than one.

24. The non-transitory computer readable medium according to claim 13, further comprising utilizing over the air signalling to synchronize traffic key identities used by the user terminal device with those used by the new streaming server.

25. An apparatus, comprising:
  at least one processor; and
  at least one memory including computer program code, where the at least one memory and the computer program code are configured, with the at least one processor, to cause the apparatus to at least:
  trigger a new streaming server of a communication network to generate new user-specific security keys for a previously established streaming service in the communication network, wherein triggering the new streaming server to generate the new user-specific security keys comprises starting a generic bootstrapping architecture bootstrapping run;
  receive from the new streaming server a new security key specific for the new streaming server;
  generate at the user terminal device for the streaming server user-specific security keys, wherein the new user-specific security keys for the new streaming server are generated before receiving the new security key specific for the new streaming server, and wherein the generated new user-specific security keys comprise a multimedia broadcast/multicast service user key and a multimedia broadcast/multicast service request key; and use the new user-specific security keys generated at the user terminal device for the new streaming server for the previously established streaming service.

26. The apparatus according to claim 25, wherein the streaming service is a multimedia broadcast/multicast service and the previously established streaming service is provided by the new streaming server of a coverage area of the communication network to which the user terminal device has moved while receiving the multimedia broadcast/multicast service.

27. The apparatus according to claim 26, wherein the multimedia broadcast/multicast service uses a multimedia broadcast/multicast service traffic key identity from a network time protocol-universal time coordinated server, and wherein the multimedia broadcast/multicast service traffic key identity is synchronized with the new streaming server.

28. The apparatus according to claim 25, wherein the generating is using a streaming service traffic key identification specific for the new streaming server that is selected from more than one streaming service traffic key identification stored on the user terminal device, and wherein a frequency that the user terminal device stores streaming service traffic key identifications is configured by the user terminal device for each streaming service traffic key identification based on an expected lifetime length of an associated streaming service traffic key.

29. The apparatus according to claim 25, wherein the streaming service is a broadcast service and the new streaming service provider is a new server of a coverage area of the communication network to which the user terminal device has moved while receiving the broadcast service.

30. The apparatus according to claim 29, wherein the generated new user-specific security keys comprise a subscriber management key or rights encryption key and a subscriber identity.

31. The apparatus according to claim 28, wherein the more than one streaming service traffic key identification stored on the user terminal device comprises an $n^{th}$ number of streaming service traffic key identifications, wherein each of the $n^{th}$ number of streaming service traffic key identifications is specific to a different streaming server of the communication network, where n number of streaming service traffic key identifications is established via signalling with the user terminal device and n is an integer greater than one.

32. The apparatus according to claim 25, wherein the new security key specific for the new streaming server comprises a new multimedia broadcast/multicast service key or a new service encryption key or program encryption key.

33. The apparatus according to claim 32, wherein the generating comprises generating a new shared key generic bootstrapping architecture for the user terminal device for usage with the new streaming server based on the generic bootstrapping architecture master key Ks.

34. The apparatus according to claim 25, wherein the triggering is performed automatically in response to expiration or near expiration of an old security key specific for an old streaming server which was formerly providing the streaming service to the user terminal device.

35. The apparatus according to claim 27, wherein the at least one processor including the computer program code is configured with the at least one memory to cause the apparatus to store in a smart card of the user terminal device only each $n^{th}$ streaming service traffic key specific to the multimedia broadcast/multicast service or broadcast service, where n is established via signalling and is an integer greater than one.

36. The apparatus according to claim 25, wherein the at least one processor including the computer program code is configured with the at least one memory to cause the apparatus to utilize over the air signalling to synchronize traffic key identities used by the user terminal device with those used by the new streaming server.

* * * * *